May 30, 1967 J. C. SIMS, JR 3,323,115

REPRODUCING SYSTEM FOR PHASE MODULATED MAGNETICALLY RECORDED DATA

Filed Aug. 31, 1964 2 Sheets-Sheet 1

INVENTOR.
JOHN C. SIMS, JR.
BY
Kenway, Jenney & Hildreth
ATTORNEYS

INVENTOR.
JOHN C. SIMS, JR.
BY
Kenway, Jenney & Hildreth
ATTORNEYS

United States Patent Office 3,323,115

Patented May 30, 1967

3,323,115

REPRODUCING SYSTEM FOR PHASE MODULATED MAGNETICALLY RECORDED DATA

John C. Sims, Jr., Sudbury, Mass., assignor to Anelex Corporation, Boston, Mass., a corporation of New Hampshire Filed Aug. 31, 1964, Ser. No. 393,242
7 Claims. (Cl. 340—174.1)

Figure 1:
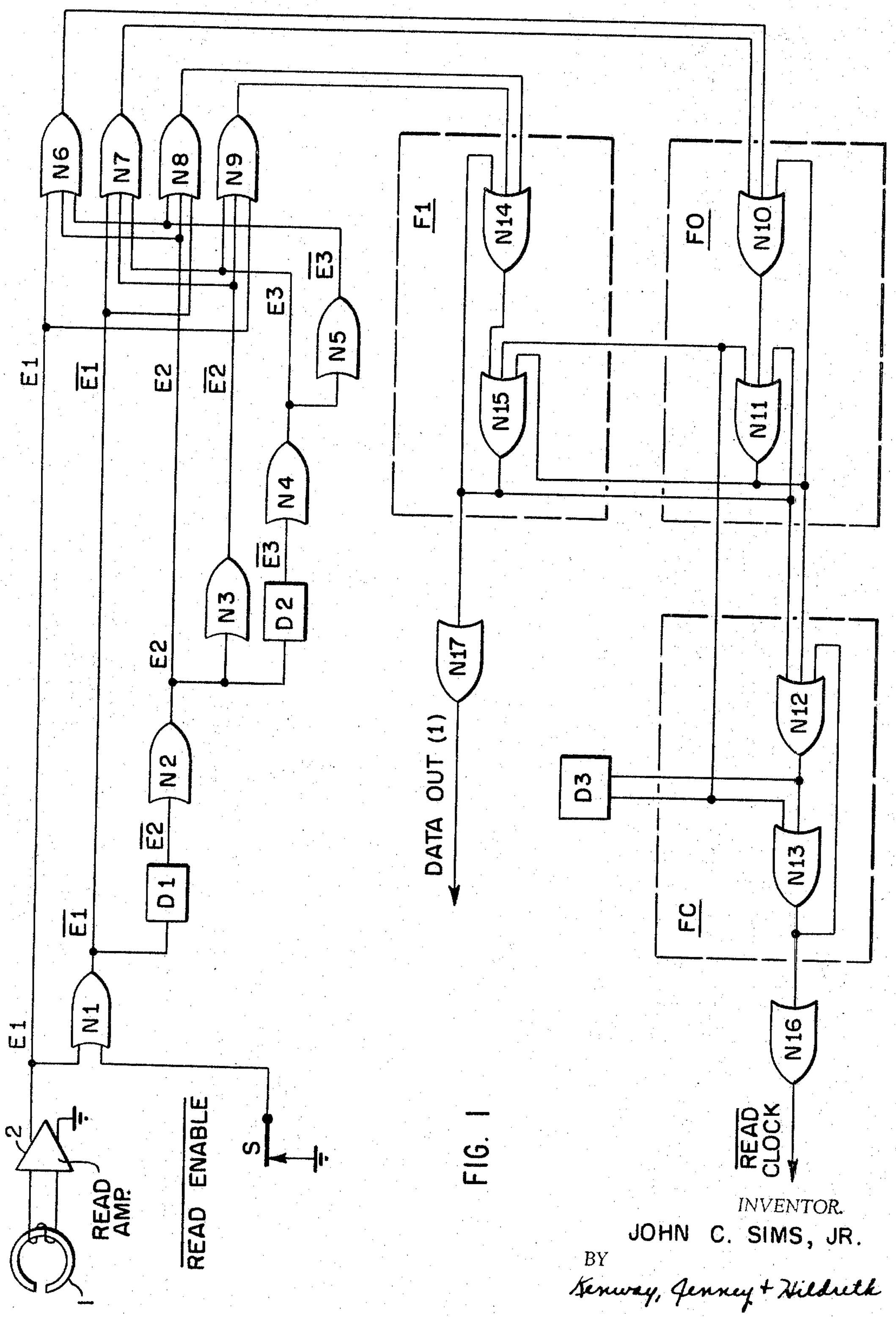

My invention relates to data processing apparatus, and particularly to an improved system for recovering data recorded in phase modulated form.

In my copending application Ser. No. 341,969, filed on February 3, 1964 for Phase Modulated Magnetic Recording and Reproducing System and assigned to the assignee of this application, I have shown and described a magnetic recording and reproducing system in which data is recorded in the form of a train of signals which represent one truth value of a set such as 1 and 0 by an alternating voltage of fixed frequency, having a period equal to one bit time. The occurrence of the other truth value in the signal train is represented by inverting the phase of the recording voltage, once for each occurrence of that truth value. The result is a train of signals in which one truth value is represented by a full cycle of alternating voltage at a first frequency, and the other value is represented by a half cycle at one-half the frequency. The data so recorded is recovered by a reading head reproducing the recorded train of signals, and the reproduced signals are caused to produce two delayed trains of signals, each delayed with respect to the reproduced data train by a different amount equal to more than one half but less than one whole bit time, the bit time being equal to the period of the first frequency. The three signals thus made available, and their complements, which are also generated, are compared with each other, and logical combinations are detected which will distinguish between the recorded truth values. It is the primary object of my invention to improve the reliability of data reproduction in systems of this kind. More specifically, in the data reproducing system described in my above-cited copending application, data reproduction is based on logical relationships between three voltage trains which may be termed E1, E2 and E3. The signal train E1 is the voltage recovered from the recording medium, suitably shaped to provide an essentially square wave form. The voltage E2 is delayed from the voltage E1 by more than one-half but less than one whole bit time, and for example, may be delayed six-tenths of a bit time. The voltage E3 is delayed from the voltage E1 by a time within the range of more than one half but less than one whole bit time, and more than the voltage E2, by an amount sufficient to produce reliable sampling. For example, the voltage E3 may be delayed nine-tenths of a bit period. Assuming that the only characteristics of these voltages which it is desired to detect is the presence or absence of the voltage at a given polarity at a particular time, there are eight possible logical relations between the voltage trains E1, E2 and E3. Representing the voltages as E1, E2 and E3 when each is present at the assumed polarity, and by $\overline{E1}$, $\overline{E2}$ and $\overline{E3}$ when they are not present at that polarity, corresponding to a bit time in which the voltage train E1 consists of a full cycle at the fundamental frequency, the set of relations $E1\cdot\overline{E2}\cdot E3$ and $\overline{E1}\cdot E2\cdot\overline{E3}$ will occur. Corresponding to a bit time in which a half cycle at one-half the fundamental frequency is recorded, one or the other of the set of relationships $E1\cdot E2\cdot\overline{E3}$ and $\overline{E1}\cdot\overline{E2}\cdot E3$ will occur, in dependence on the polarity of the half cycle recorded. In the mode of recording adopted, no attempt is made to record these half cycles in any particular phase, so that gating is required to recognize both members of the second set to accurately reproduce the truth value represented by such half cycles. For each full cycle at the fundamental frequency, both of the set of logical conditions will occur, and accordingly, in my above-cited copending application I have shown apparatus for recognizing only one of them, the other being redundant. However, in this mode of correlation a data bit may be produced at either of two times, one during the bit time of the reproduced bit and one during the bit time of the next reproduced bit. I have found that a considerable improvement in efficiency and reliability may be made with little additional apparatus by recognizing both of the conditions indicating the cycle at the first frequency, and producing simultaneous clock and data pulses at a predetermined time during the bit time of the reproduced bit which always occurs in synchronism with clock and data pulses for bits recorded as half cycles at one-half the first frequency. In order to prevent redundant reproduction of truth values represented by the dual set indicating a full cycle at the first frequency, means are provided for inhibiting reproduction of a bit in response to the second of two logical conditions indicating the same truth value in response to a single full cycle of recorded voltage at the first frequency. In addition, apparatus is provided for so shaping reproduced data pulses and clock pulses that each has a predetermined wave form and duration. By this arrangement, it is possible to reproduce data which is considerably more distorted in phase and amplitude, and has a higher noise-to-signal ratio, than was possible prior to my invention.

The apparatus of my invention will best be understood in the light of the following detailed description, together with the accompanying drawings, of a preferred embodiment thereof.

Figure 2:
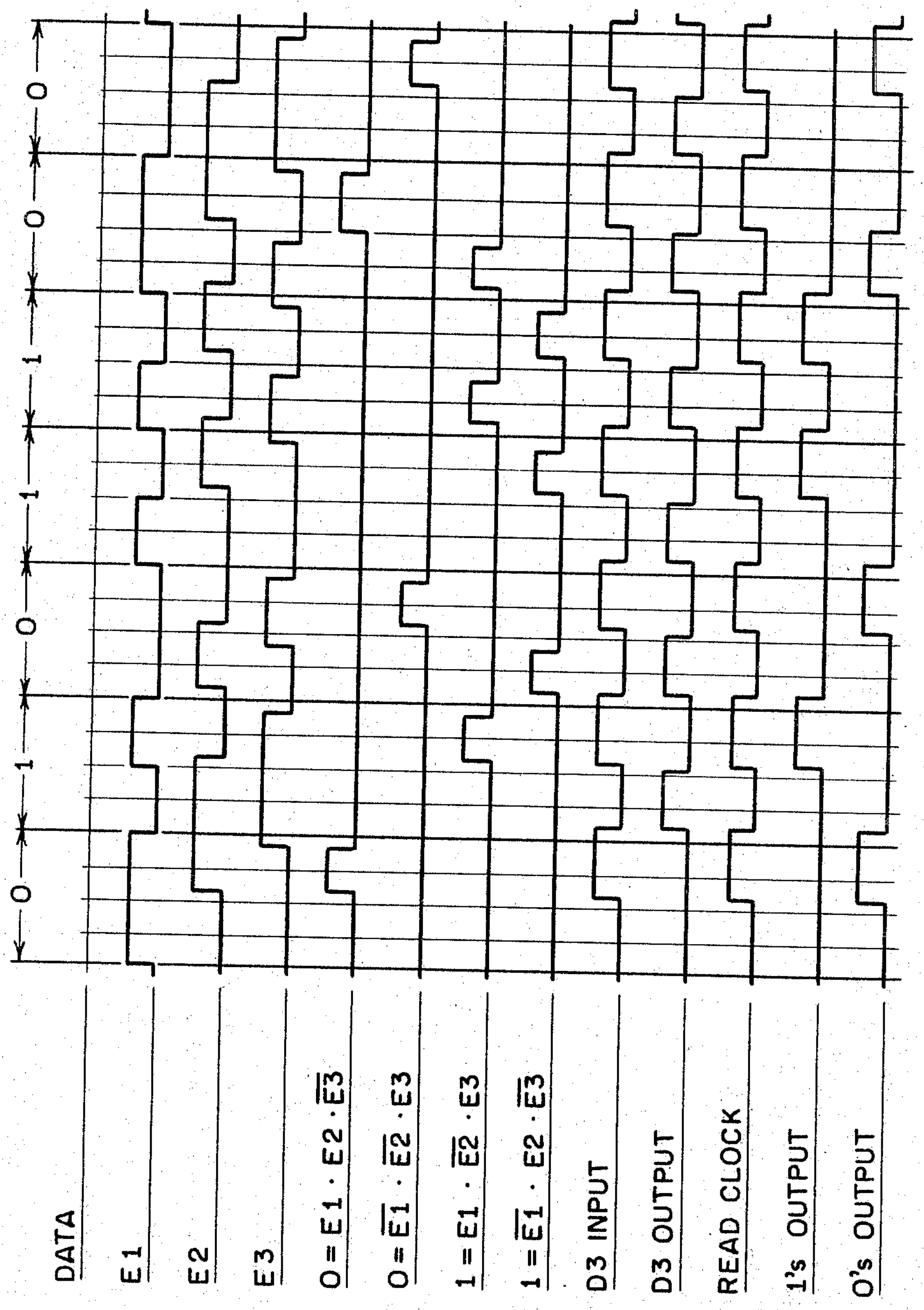

In the drawings,

FIG. 1 is a schematic wiring diagram of a data reproducing system in accordance with my invention; and FIG. 2 is a timing chart showing various conditions existing during the operation of the apparatus of FIG. 1 under typical conditions.

Referring now to FIG. 1, I have shown a reproducing system adapted to be supplied with signals by a conventional recording head 1 cooperating with a suitable magnetic recording surface such as a disc or drum. Apparatus for recording phase modulated information in accordance with my invention on such a disc is shown and described in my above-cited copending application.

Signals reproduced by the recording head 1 are amplified and shaped in a conventional manner in a conventional read amplifier 2. The output of the read amplifier is a train of voltage pulses E1 which may fluctuate between any selected extremes, and, for example, between −6 volts and 0 volts with respect to ground. While other conventions could obviously be adopted, for simplicity it will here be assumed that 0 volts represents a data one bit or a truth value of 1, and −6 volts represents the truth value of 0.

The output of the amplifier 2 is applied to one input terminal of a conventional NOR gate N1. This gate may be of the type shown and described as the gate A1 in FIG. 1 of my above-cited copending application, or may be of any other conventional construction. Basically, it will be assumed that this gate is of a known construction such that when and only when none of its input terminals is at ground potential or at a more positive potential, it will produce a ground potential current sink at its output terminal. If any of its input terminals are connected to ground, the output terminal will act as an open circuit, and will not conduct current.

Conventional apparatus for turning the reproducing system of my invention on and off is here shown as a switch S normally connected to ground to provide a level labelled "not read enable," which will prevent operation of the apparatus of the rest of the system. When the switch S is open, normal operation of the reproducing system will take place.

The output terminal of the gate N1, producing the voltage $\overline{E1}$ when the switch S is open, is connected to a NOR gate N7, to be described, and also to an input terminal of a conventional delay line D1. The delay line D1 is selected to produce a first delay of more than one-half bit time but less than a whole bit time. For convenience, a fundamental frequency of 500 kilocycles per second will be assumed, with a corresponding bit period of 2 microseconds. As an example, the delay line D1 may be adjusted to produce a delay of 1.2 microseconds. In practice, I prefer to connect two six-tenths microsecond delay lines in series, and to use lumped-constant delay lines incorporating a single stage of amplification. Since each such delay line introduces a phase inversion, the net result is that the output of the delay line D1 is not logically inverted. This output is labelled $\overline{E2}$, and is applied to the single input terminal of a conventional NOR gate N2. This NOR gate provides a logical inversion to produce the signal train E2. If a single delay line unit was used for the delay line D1, the NOR gate N2 could obviously be omitted.

The output terminal of the NOR gate N2 is connected to the sole input terminal of a conventional NOR gate N3 to produce a signal train $\overline{E2}$. It is also connected to the input terminal of a second delay line D2, which produces an added delay that in addition to the delay produced by the delay line D1 is still less than one bit time. As an example, the delay line D2 may be adjusted to produce a delay of six-tenths microseconds with the values above discussed. In view of the logical inversion of the delay line D2, the output terminal produces a voltage train $\overline{E3}$. This output is applied to the input terminal of a conventional NOR gate N4, which produces at its output terminal a train of signals E3. The output terminal of the gate N4 is connected in parallel to input terminals of three conventional NOR gates N7, N9 and N5. The gate N5 produces a voltage train $\overline{E3}$, used instead of the output of the delay line D2 for purposes of isolation. In the preferred embodiment of the invention, the information is recorded by changing phase on 0's in the data. Superficially, there is no reason for preferring to change phase on 0's rather than to change phase on 1's, but in practice I find that 0's occur more frequently in data in most conventional data processing installations, and by changing phase on 0's the recorded information is at a lower frequency for a larger portion of the time, enhancing circuit reliability. With the data so recorded, the logical conditions occurring when a 0 is recorded are one of the set comprising $E1 \cdot E2 \cdot \overline{E3}$ and $\overline{E1} \cdot \overline{E2} \cdot E3$. The gate N6 is employed to detect the condition $\overline{E1} \cdot \overline{E2} \cdot E3$. Since NOR logic is used, the inputs are the complement of the condition to be detected, namely, E1, $\overline{E3}$ and E2. The NOR gate N7 detects the logical condition $E1 \cdot E2 \cdot \overline{E3}$. In NOR logic, this is implemented by connecting the input terminals of the gate N7 to receive the signals $\overline{E1}$, $\overline{E2}$ and E3.

The gate N8 detects one of the conditions occurring when a logical 1 is to be detected, namely, the logical condition $E1 \cdot \overline{E2} \cdot E3$. For this purpose, the NOR gate input terminals are connected to receive the voltage trains $\overline{E1}$, E2 and $\overline{E3}$. Similarly, the NOR gate N9 is used to detect the logical condition $\overline{E1} \cdot E2 \cdot \overline{E3}$ by having its terminals connected to receive the input trains E1, $\overline{E2}$ and E3. When the associated condition is detected, the output terminal of the corresponding gate N6, N7, N8 or N9 will be at ground potential, serving as a current sink and representing a logical 1 for the condition to be detected.

The outputs of the gates N6 through N9 are registered in a series of three flip-flops F0, F1 and FC. Each of these flip-flops comprises a pair of conventional NOR gates connected in back to back relation in a manner known to the art. Specifically, the flip-flop F0 which registers zeros in the incoming data comprises a pair of conventional NOR gates N10 and N11. The flip-flop FC, which registers reconstituted clock pulses, that is, registers a pulse for either a 1 or a 0 detected in the data and thus forms a reconstituted data clock train, comprises the gates N12 and N13. The flip-flop F1, which registers 1's in the data, comprises the gates N14 and N15. It will be seen that the flip-flop F0 can be set by either of the gates N6 or N7, the flip-flop F1 can be set by either of the gates N8 or N9, and the flip-flop FC is set by the flip-flops F0 and F1 when either of them is set. Manifestly, the same result could be obtained by connecting the outputs of all of the gates N6, N7, N8 and N9 through suitable isolating circuits to set input terminals of the flip-flop FC, but the construction shown is preferred as it makes use of the flip-flops F0 and F1 to provide the necessary isolation. The output clock pulses may be supplied from the logic 1 output terminal of the flip-flop FC, as shown, through a conventional NOR gate N16 used as in inverter and producing a level "not read clock." A NOR gate N17 is provided to produce a data output comprising a pulse for each 1 in the data. As shown, the output is logically inverted, although this would obviously not be necessary if it were not desired. For example, in practice it is desirable to control a cable driving amplifier, which may invert or not, from the output NOR gate. While not shown, it is clear that a similar output connection could be provided from the output terminal of the zeros flip-flop F0.

One output terminal of the flip-flop FC, comprising the output terminal of the gate N12, is connected to the input terminal of a conventional delay line D3. The delay of this line should be selected to be approximately one-half of a bit time, less about five percent, or 0.95 microsescond in the case of a fundamental frequency of 500 kilocycles per second. The output of the delay line is logically inverted, and is applied to reset the flip-flop F0, FC and F1 at the delayed time after they are set. Since the flip-flops will be set for the delay time of the delay line D3 before they are so reset, the resetting pulse provided by the delay line is its delay time in duration, or 0.95 miscrosecond in the example given, and none of the flip-flops F0, FC or F1 can be reset during this time interval. This connection prevents false operation, and produces precisely timed output clock and data pulses, as will appear.

Additional connections included to prevent false operation under certain circumstances are the connections from the output terminal of the gate N11 in the flip-flop F0 to the reset input terminal of the gate N15 in the flip-flop F1, and the corresponding connection between the output terminal of the gate N15 in the flip-flop F1 and the input terminal of the NOR gate N11 in the flip-flop F0. These connections positively inhibit setting of one of the flip-flops when the other has been set. These connections prevent false operation under wider conditions of phase or amplitude distortion than can be accommodated without them.

Having described the structure of the preferred embodiment of my invention, its operation will next be described in connection with the timing chart of FIG. 2. Referring to FIG. 2, operation has been illustrated comprising the reconstituting of a train of data consisting of the logical sequence 0101100. This data may initially be recorded by the apparatus shown in my copending application referred to above, except that the input data pulses representing zeros are used to switch the phase of the applied signal. Briefly, this is accomplished by producing, with an oscillator in combination with an inverter, a pair of trains of square wave pulses at the fundamental frequency of 500 kilocycles per second and 180 degrees out of phase. One or the other of these signal trains is gated to the write head of an otherwise conventional recording unit in dependence on whether the current data bit is a 1 or a 0. If the data bit is a 1, the one or the other of the signal trains then connected to the write head is left connected, whereas if it is 0, after one-half cycle the phase is switched and the other signal is applied to the write head. As shown in FIG. 2, the zeros in the data train are thereby represented in the signal train E1 by pulses of one or the opposite polarity comprising a half cycle at one-half the fundamental frequency. Each of the 1's in the data is represented as a full cycle of one phase or another depending on the previous data. The signal trains E1, E2 and E3 in FIG. 2 may be considered to represent, at the high points, ground level current sinks at the terminals on which the signals appear, and at the low points, an open circuit condition. However, conventional gating apparatus in which voltage levels or current levels are used to represent data would be similiarly represented, without making a difference in the operation of the system.

As shown in FIG. 2, the signal train E2 is delayed from the signal train E1 by about 1.2 microseconds, representing six-tenths of a bit, and the train E3 is delayed from the train E1 by 1.8 microseconds, corresponding to nine-tenths of a bit period. Below the signals E1, E2 and E3 in FIG. 2 are represented the four signal trains corresponding to the recognition of 0's and 1's in the input data. The first of these, $0=E1\cdot E2\cdot \overline{E3}$, may be considered to be the output of the gate N7; the next, $0=\overline{E1}\cdot \overline{E2}\cdot E3$, is the output of the gate N6. The 1's detecting conditions $1=E1\cdot \overline{E2}\cdot E3$ and $1=\overline{E1}\ E2\ \overline{E3}$ represent the outputs of the gates N8 and N9, respectively.

It will be seen that which of the 0 detecting conditions occurs when a 0 is recorded in the data depends on whether the half cycle at half the fundamental frequency and representing the 0 is of a first or an opposite polarity. At the read amplifier output, these signals would be ground level or minus six volts and at the outputs of the various NOR gates, they would be grounds or open circuits. It will be noticed that only one of the zero detecting conditions occurs for each zero recorded, so that both are logically necessary to recognize such zeros as may be encountered. On the other hand, it will be seen that the 1 detecting conditions occur once for each 1 in the data train, whether the 1 is of a first phase, as shown for the first 1 in FIG. 2, or of a second phase, as shown for the second and third 1's in the data train. However, the phase of the 1 in the data train determines which of the 1 detecting conditions occurs within the bit time, and it will be seen that the upper line responds to the first 1 first, whereas the lower line responds to the second 1 first. It will be noticed in FIG. 2 that since the input to the delay line D3 is formed at approximately the time the setting input to the flip-flop FC occurs when the corresponding NOR gate first responds, and that the flip-flops F0, FC and F1 will not be reset until this condition appears at the output of the delay line D3 to restore the flip-flops, the input of the delay line D3 will persist when initiated by one of the gates N6 through N9 until the delay line D3 output appears 0.95 microsecond later. This input to the delay line D3 corresponds to the output time for the read clock pulses, produced by inversion of the NOR gate N16. During the time when the delay line D3 produces an output ground level, none of the flip-flops F0, FC or F1 can be set. Accordingly, the D3 output pulses represent inhibiting times during which no flip-flop can be set. Since there is no false pulse following the detection of the first 0, this action is unimportant at this time. However, during an interval after each of the first 1 detecting conditions is encountered, the delay line D3 output is employed to inhibit the setting of the flip-flops in response to the second 1 detecting pulse emitted. Thus, only one such pulse is recognized for each 1 in the data. In summary, without requiring phase correlation between the recorder and the reproducing apparatus, a completely reconstituted and reshaped data train is provided in conjunction with a reconstituted clock train of precisely timed duration.

While I have described one embodiment of my invention in detail, many changes and variations will occur to those skilled in the art upon reading my description, and such can obviously be made without departing from the scope of my invention.

Having thus described my invention, what I claim is:

1. Apparatus for reproducing data represented by a train of signals E1 in which binary bits of one value are represented by a full cycle at a first frequency and binary bits of an opposite value are represented by a half cycle at one-half said first frequency, a full cycle at either frequency comprising a first time period in which a predetermined signal characteristic has one truth value and a second equal time period in which said characteristic has a second truth value, comprising delay means responsive to said first signals for producing second and third signals E2 and E3 of the same waveform and delayed with respect to said first signals by an amount less than the period corresponding to said first frequency and more than one-half said period, said signals E3 being delayed more than said signal E2, means for producing signals $\overline{E1}$, $\overline{E2}$ and $\overline{E3}$ in accordance with the complements of the signals E1, E2 and E3, first, second, third and fourth gating means each responsive to said signals for producing an output signal at different times when and only when the signals have the logical relationships $\overline{E1}\cdot \overline{E2}\cdot E3$, $E1\cdot E2\cdot \overline{E3}$, $E1\cdot \overline{E2}\cdot E3$ and $\overline{E1}\cdot \overline{E2}\cdot E3$, respectively, with respect to a predetermined truth value of said signal characteristic, first, second and third registering means in its first states for setting said third register-means controlled by the output signals of each of said first and second gating means for setting said first registering means to its first state, means controlled by the output signals of each of said third and fourth gating means for setting said second gating means to its first state, means controlled by each of the first and second registering means in its first states for setting said third registering means to its first state, and delay means controlled by said third registering means in its first state for setting said registering means to their second states a predetermined time approximately equal to one half the period at said first frequency after said third registering means is set to its first state and holding said registering means in their second states for said predetermined time.

2. Apparatus for reproducing binary data from a coded signal source, comprising correlating means controlled by said source for producing a first or a second output signal for each bit of data from said source according as the bit represents a first or a second truth value, respectively, first, second and third registers each settable to a first and a second state, means responsive to said first output signal for setting said first register to its first state, means responsive to said second output signal for setting said second register to its first state, means responsive to both of said signals for setting said third register to its first state when either signal is produced, delay means controlled by said third register in its first state for producing a resetting signal after a predetermined time, and means controlled by said resetting signal for setting said register means to their second states.

3. The apparatus of claim 2, further comprising means controlled by said first register in its first state for setting said second register to its second state, and means controlled by said second register in its first state for setting said first register to its second state.

4. Apparatus for reproducing data bits represented by a train of signals, each signal having the same predetermined duration and having a first or second characteristic according as it represents a bit having a first or a second truth value, respectively, first, second and third registers each settable to a first and a second state, first means controlled by said signals for setting said first register to its first state in response to each signal having said first characteristics, second means controlled by said signals for setting said second register to its first state in response to each signal having said second characteristics, means controlled by said first register in its first state for setting said third register to its first state, means controlled by said second register in its first state for setting said third register to its first state, delay means controlled by said third register for producing an output signal in accordance with the state of said third register at a predetermined earlier time substantially equal to but less than said predetermined duration, and means controlled by said output signal for setting said registers to their second states said predetermined time after said third register is set to its first state and holding said registers in their second states for said predetermined time.

5. The apparatus of claim 4, further comprising means controlled by said first register in its first state for setting said second register to its second state, and means controlled by said second register in its first state for setting said first register to its second state.

6. Apparatus for decoding a first phase modulated alternating signal E1 in which binary bits of one value are represented by a full cycle of alternation between a first and a second characteristic at a first frequency and binary bits of an opposite value are represented by a half-cycle of alternation between said characteristics at one-half said first frequency, comprising delay means responsive to said first signal for producing second and third signals E2 and E3 of the same waveform and delayed with respect to said first signal by an amount less than the period corresponding to said first frequency and more than one-half the period corresponding to said first frequency, said third signal being delayed more than said second signals, first, second, third and fourth gating means responsive to the characteristics of said signals for producing first, second, third and fourth output signals when said polarities have the relationships $E1 \cdot E2\ \overline{E3}$, $\overline{E1} \cdot E2 \cdot \overline{E3}$, $E1 \cdot \overline{E2} \cdot E3$, and $\overline{E1} \cdot E2 \cdot \overline{E3}$, respectively, first, second and third registers each settable to a first and a second state, means controlled by said first and second gating means for setting said first register to its first state in response to either of said first and said second output signals, means controlled by said third and fourth gating means for setting said second register to its first state in response to either of said third and fourth output signals, means controlled by all of said gating means for setting said third register to its first state in response to any of said output signals, delay means for producing an output signal in accordance with the state of said third register and delayed therefrom by a predetermined time approximately equal to one-half the period of said first frequency, and means controlled by the output signal of said delay means for setting said registers to their second states said predetermined time after said third register is set to its first state and holding said registers in their second states for said predetermined time.

7. The apparatus of claim 6, further comprising means controlled by said first register in its first state for setting said second register to its second state, and means controlled by said second register in its first state for setting said second register to its second state.

No references cited.

BERNARD KONICK, *Primary Examiner.*

TERRELL W. FEARS, *Assistant Examiner.*